United States Patent
Choi et al.

(10) Patent No.: US 8,359,623 B2
(45) Date of Patent: Jan. 22, 2013

(54) BROADCAST SIGNAL RECEIVING APPARATUS AND CONTROL METHOD THEREOF

(75) Inventors: Seung-hyuk Choi, Suwon-si (KR); Seung-seop Shim, Anyang-si (KR); Moon-seok Han, Suwon-si (KR); Joon-hyuk Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1184 days.

(21) Appl. No.: 11/949,344

(22) Filed: Dec. 3, 2007

(65) Prior Publication Data

US 2008/0273118 A1    Nov. 6, 2008

(30) Foreign Application Priority Data

May 2, 2007    (KR) ........................ 10-2007-0042774

(51) Int. Cl.
     *H04N 7/18*      (2006.01)
     *H04N 7/173*      (2011.01)

(52) U.S. Cl. ........................... 725/117; 725/81; 725/106

(58) Field of Classification Search .................. 348/192, 348/553, E5.005; 455/3.06, 404.02, 566; 725/81, 117

See application file for complete search history.

(56) References Cited

U.S. PATENT DOCUMENTS

| | | | |
|---|---|---|---|
| 2002/0137496 A1 | 9/2002 | Nagaoka et al. | |
| 2005/0130585 A1* | 6/2005 | Gnuschke et al. | 455/3.06 |
| 2005/0130586 A1* | 6/2005 | Gnuschke et al. | 455/3.06 |
| 2005/0229226 A1* | 10/2005 | Relan et al. | 725/114 |
| 2006/0105749 A1 | 5/2006 | Han et al. | |

FOREIGN PATENT DOCUMENTS

| | | |
|---|---|---|
| CN | 1386333 A | 12/2002 |
| CN | 1777277 A | 5/2006 |
| EP | 1213842 A1 | 6/2002 |
| JP | 2002-056241 A | 2/2002 |
| JP | 2003-309734 A | 10/2003 |
| JP | 2006-197512 A | 7/2006 |
| KR | 10-2004-0105669 A | 12/2004 |
| KR | 10-2006-0010957 A | 2/2006 |
| KR | 10-2006-0054519 A | 5/2006 |
| KR | 10-2006-0056136 A | 5/2006 |

OTHER PUBLICATIONS

Chinese Office Action issued on Jul. 6, 2011 in the corresponding Chinese Patent Application No. 200810094386.1.
Communication dated Apr. 20, 2012 issued by the State Intellectual Property Office of P.R. China in counterpart Chinese Patent Application No. 200810094386.1.

* cited by examiner

*Primary Examiner* — Kieu Oanh T Bui
(74) *Attorney, Agent, or Firm* — Sughrue Mion, PLLC

(57) ABSTRACT

A broadcast signal receiving apparatus including a broadcast receiving unit that receives a broadcast signal; a communicating unit that performs communication with a mobile apparatus; a signal converting unit that converts the received broadcast signal; and a controller that controls the signal converting unit to convert the broadcast signal into a format corresponding to the mobile apparatus, and controls the communicating unit to transmit the converted broadcast signal to the mobile apparatus.

17 Claims, 6 Drawing Sheets

BROADCAST SIGNAL RECEIVING APPARATUS AND CONTROL METHOD THEREOF

CROSS-REFERENCE TO RELATED APPLICATIONS

This application claims priority from Korean Patent Application No. 10-2007-0042774, filed on May 2, 2007 in the Korean Intellectual Property Office, the disclosure of which is incorporated herein by reference.

BACKGROUND OF INVENTION

1. Field of Invention

Apparatuses and methods consistent with the present invention relate to a broadcast signal receiving apparatus and a control method thereof and, more particularly, to a broadcast signal receiving apparatus that transmits a broadcast signal to a mobile apparatus, and a control method thereof.

2. Description of the Related Art

As mobile apparatuses such as personal digital assistants (PDAs), mobile phones and so on come into wide use, there is an increasing demand for home network systems for transmitting a broadcast signal recorded in a broadcast signal receiving apparatus such as a TV to the mobile apparatuses which then reproduce the broadcast signal. A home network system is constructed by an Internet protocol-based private network and refers to a network system interconnecting PCs, electronic products, mobile apparatuses and so on for home use.

Referring to FIG. 1, in such a home network system, a personal computer (PC) 300 receives a broadcast signal recorded in a broadcast signal receiving apparatus 100 and converts the received broadcast signal into a signal which can be reproduced in a mobile apparatus 200. This receiving and converting process is controlled by a server 400.

Accordingly, the home network system has to be provided with the server 400 and the PC 300 separately in addition to the broadcast signal receiving apparatus 100.

In addition, in order to transmit the broadcast signal converted in the PC 300 to the mobile apparatus 200, a user has to directly interconnect the PC 300 and the mobile apparatus 200 and perform a troublesome work for data transmission.

SUMMARY OF THE INVENTION

Accordingly, it is an aspect of the present invention to provide a broadcast signal receiving apparatus which is capable of transmitting a broadcast signal to a mobile apparatus in a simple configuration without using a server or a PC, and a control method thereof.

Another aspect of the present invention is to provide a broadcast signal receiving apparatus which is capable of converting and transmitting a broadcast signal without difficulty with various formats corresponding to various mobile apparatuses, and a control method thereof.

Still another aspect of the present invention is to provide a broadcast signal receiving apparatus which is capable of transmitting a broadcast signal to a mobile apparatus simply at time desired by a user through wireless communication, and a control method thereof.

Additional aspects of the present invention will be set forth in part in the description which follows and, in part, will be obvious from the description, or may be learned by practice of the present invention.

The foregoing and/or other aspects of the present invention can be achieved by providing a broadcast signal receiving apparatus including: a broadcast receiving unit that receives a broadcast signal; a communicating unit that performs communication with a mobile apparatus; a signal converting unit that converts the received broadcast signal; and a controller that controls the signal converting unit to convert the broadcast signal into a format corresponding to the mobile apparatus, and controls the communicating unit to transmit the converted broadcast signal to the mobile apparatus.

According to an aspect of the invention, the broadcast signal receiving apparatus further includes an information storing unit that stores identification information on the mobile apparatus, wherein the controller performs to convert and transmit the broadcast signal for the mobile apparatus corresponding to the identification information stored in the information storing unit.

According to an aspect of the invention, the controller detects the mobile apparatus located in a communication area through the communicating unit, receives the identification information on the detected mobile apparatus, and stores the received identification information in the information storing unit.

According to an aspect of the invention, the broadcast signal receiving apparatus further includes a signal storing unit that stores the broadcast signal.

According to an aspect of the invention, the broadcast signal converted in the signal converting unit is stored in the signal storing unit.

According to an aspect of the invention, the controller detects the mobile apparatus located in a communication area through the communicating unit, searches for the broadcast signal stored in the signal storing unit, and transmits the stored broadcast signal to the mobile apparatus based on a result of the search.

According to an aspect of the invention, the broadcast signal receiving apparatus further includes a user input unit that receives an instruction from a user, wherein the controller performs to convert and transmit the broadcast signal according to the received instruction.

According to an aspect of the invention, the communicating unit performs wireless communication with the mobile apparatus.

According to an aspect of the invention, the controller controls to transmit the broadcast signal based on information on memory capacity of the mobile apparatus, the memory capacity information being received through the communicating unit.

According to an aspect of the invention, the broadcast signal receiving apparatus further includes a display unit that displays the received broadcast signal.

According to an aspect of the invention, the controller controls the display unit to display information related to converting and transmitting of the received broadcast signal.

The foregoing and/or other aspects of the present invention can be achieved by providing a control method of a broadcast signal receiving apparatus, including: receiving a broadcast signal; converting the received broadcast signal into a format corresponding to a mobile apparatus; and transmitting the converted broadcast signal to the mobile apparatus.

According to an aspect of the invention, the control method further includes receiving identification information on the mobile apparatus, wherein the transmitting the converted broadcast signal includes performing to transmit the broadcast signal for the mobile apparatus corresponding to the identification information.

According to an aspect of the invention, the control method further includes: detecting the mobile apparatus located in a communication area; receiving identification information on the detected mobile apparatus; and storing the received identification information.

According to an aspect of the invention, the control method further includes storing the converted broadcast signal.

According to an aspect of the invention, the control method further includes searching for the stored broadcast signal, wherein the transmitting the converted broadcast signal includes performing to transmit the broadcast signal based on a result of the search.

According to an aspect of the invention, the control method further includes: detecting the mobile apparatus located in a communication area; and searching for the stored broadcast signal corresponding to the detected mobile apparatus, wherein the transmitting the converted broadcast signal includes performing to transmit the broadcast signal based on a result of the search.

According to an aspect of the invention, the control method further includes receiving an instruction from a user, wherein the converting and transmitting the broadcast signal include performing to convert and transmit the broadcast signal according to the received instruction.

According to an aspect of the invention, the control method further includes monitoring information on memory capacity of the mobile apparatus, wherein the transmitting the converted broadcast signal includes performing to transmit the broadcast signal based on a result of the monitoring.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
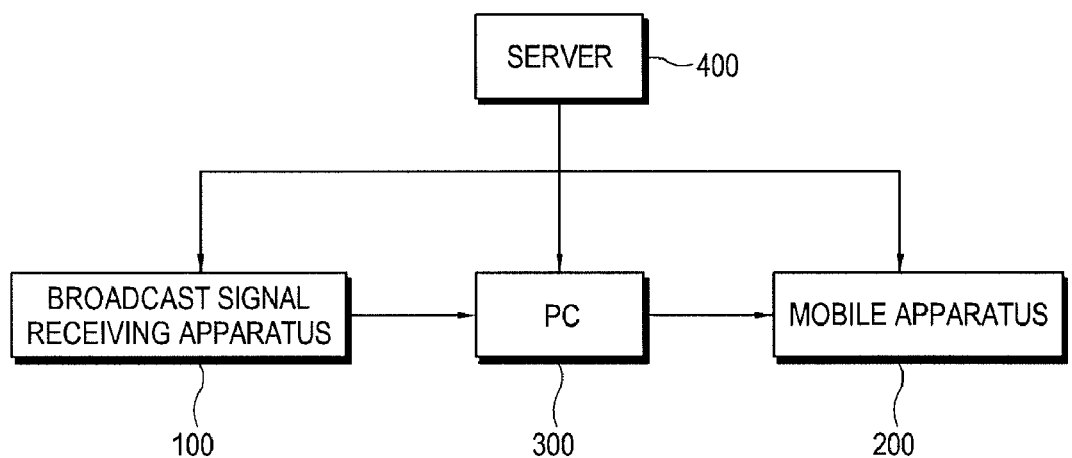
FIG. 1 is a view showing a configuration of a related art home network system.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures.

Figure 2:
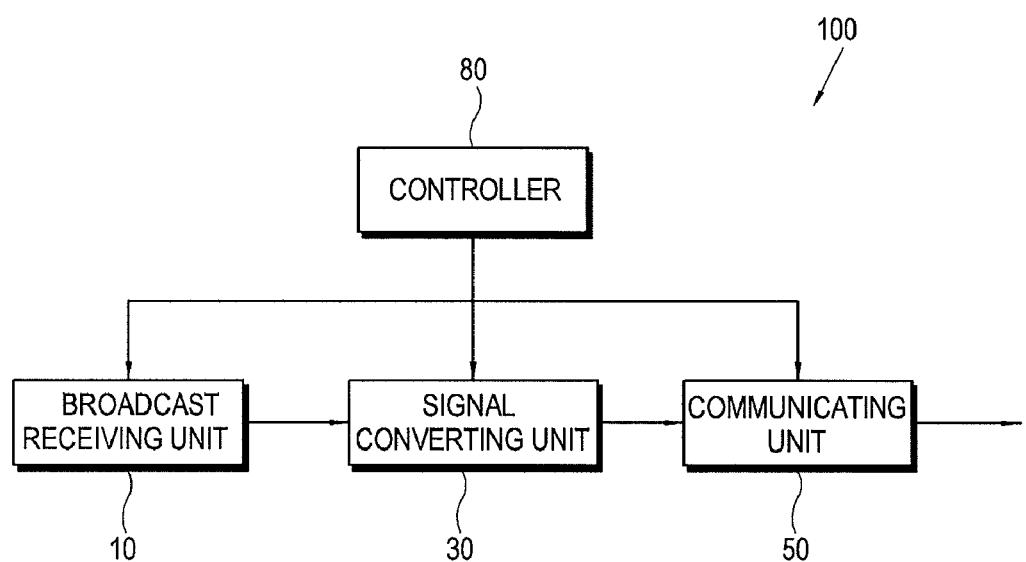
FIGS. 2 to 5 are views showing configurations of a broadcast signal receiving apparatus according to an exemplary embodiment of the present invention.

Referring to FIG. 2, a broadcast signal receiving apparatus 100 according to an exemplary embodiment of the present invention includes a broadcast receiving unit 10, a signal converting unit 30, a communicating unit 50 and a controller 80.

In this exemplary embodiment, the broadcast signal receiving apparatus 100 may be embodied by a display apparatus such as a digital TV or a monitor, a set-top box or other known display apparatuses in the art.

Figure 3:
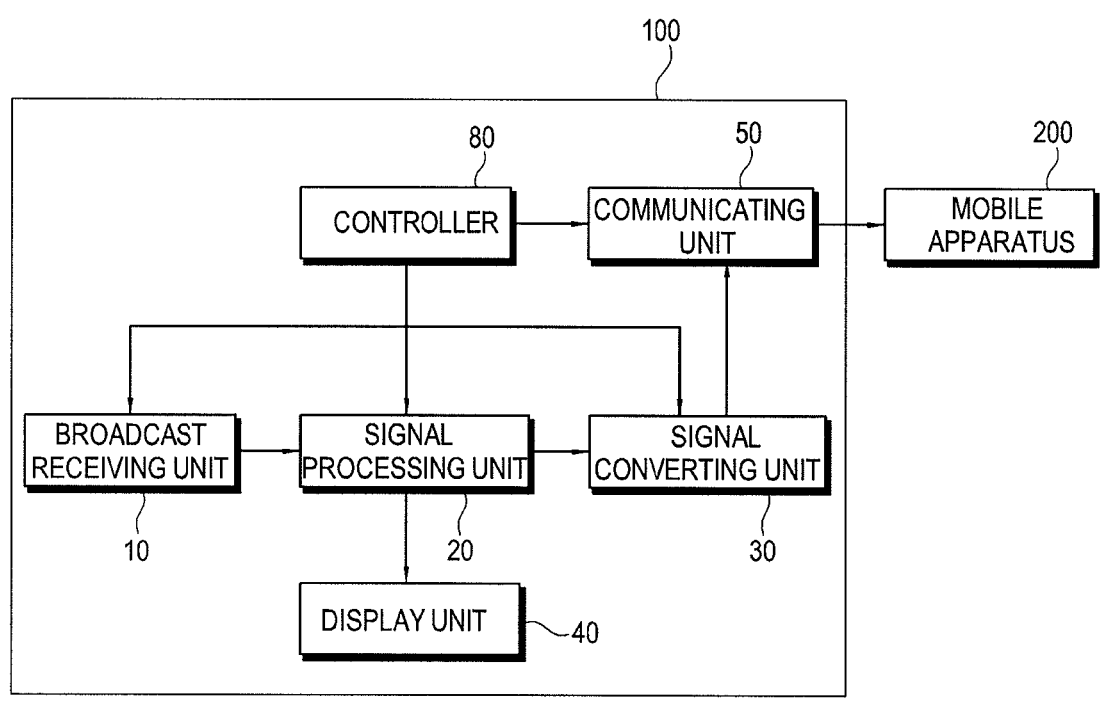

As shown in FIG. 3, the broadcast signal receiving apparatus 100 may further include a signal processing unit 20 and a display unit 40.

Figure 4:
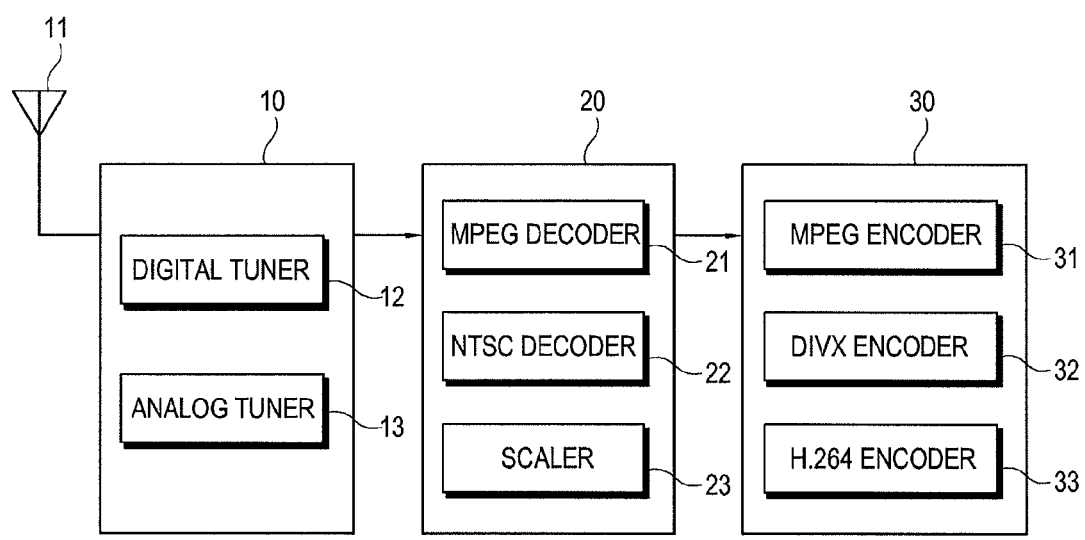

On the other hand, as shown in FIG. 4, the broadcast receiving unit 10 may include an antenna 11, a digital tuner 12 and an analog tuner 13, and the signal processing unit 20 may include a Moving Picture Experts Group (MPEG) decoder 21, a National Television System Committee (NTSC) decoder 22 and a scaler 23.

The digital tuner 12 and the analog tuner 13 tune to a broadcast signal having frequency band corresponding to tuning control signal from the controller 80 for a digital broadcast signal and an analog broadcast signal, respectively, which are received through the antenna 11.

The tuned digital signal of a particular channel is outputted in the form of a transport stream through a vestigial side band (VSB) demodulation process and an error correction process by a demodulator (not shown), and then is separated into a video signal, an audio signal and various additional data to be outputted in the form of a bit stream by a demultiplexer (not shown). In addition, the video signal of an MPEG format divided by the demultiplexer is decoded by the MPEG decoder 21. In this exemplary embodiment, the MPEG decoder 21 may be an MPEG2 decoder.

In addition, the analog video signal of NTSC format, which is tuned by the analog tuner 13, is decoded by the NTSC decoder 22.

The decoded analog and digital video signals are displayed on the display unit 40 after being processed by the scaler 23.

The display unit 40 may be applied to various types of display modules such as a digital light processing display (DLP), a liquid crystal display (LCD), a plasma display panel (PDP) or other known displays in the art, and the scaler 23 converts a video to meet a vertical frequency, resolution, a picture ratio and so on in compliance with an output format of the display unit 40.

On the other hand, the audio signal is decoded by an audio decoder (not shown) and then outputted to a speaker (not shown).

The signal converting unit 30 converts the received or processed broadcast signal into a format corresponding to the mobile apparatus 200 and transmits the converted broadcast signal to the mobile apparatus 200 through the communicating unit 50.

The controller 80 controls such conversion and transmission processes. The signal converting unit 30 and the controller 80 are configured separately, but may be integrated into one-micro chip.

In this exemplary embodiment, the conversion may include resolution conversion, frame conversion and image quality conversion. That is, the signal converting unit 30 converts a size or compression format of the broadcast signal so that the broadcast signal can be properly reproduced in the mobile apparatus 200.

The signal converting unit may include an MPEG encoder 31. The MPEG encoder 31 may be, for example, an MPEG4 encoder. For example, if a video signal processed in the MPEG2 format in the signal processing unit 20 is to be reproduced in a mobile communication terminal that displays the video signal in an MPEG4 format, the signal converting unit 30 compresses the decoded video signal using an MPEG4 encoder.

The video signal compressed in the MPEG4 format is restored and displayed by the MPEG4 decoder in the mobile communication terminal. The signal converting unit 30 may further include a Digital Internet Video Express (DIVX) encoder 32 and/or an H.264 encoder 33 in addition to the MPEG4 encoder as a multi-format encoder.

On the other hand, the signal converting unit 30 may convert the audio signal as well as the video signal of the received broadcast signal into a format corresponding to the mobile apparatus 200 and transmit the converted audio signal to the mobile apparatus 200.

For example, the signal converting unit 30 may compress a decoded audio signal using an MP3 encoder, a Windows Media Audio (WMA) encoder or other known encoders in the art. In this exemplary embodiment, the audio signal compressed in an MP3 format is transmitted to the mobile apparatus 200, such as a mobile MP3 player, and then restored therein.

The communicating unit 50 performs communication with the mobile apparatus 200. In this exemplary embodiment, the communicating unit 50 may include wireless communication modules such as 802.-11x, Ultra Wideband (UWB), Bluetooth, Zigbee or other wireless communication modules known in the art.

In other words, the communicating unit 50 transmits the broadcast signal converted in the signal converting unit 30 to the mobile apparatus 200 while keeping to conduct wireless communication with the mobile apparatus 200 located within a predetermined communication area.

Figure 5:
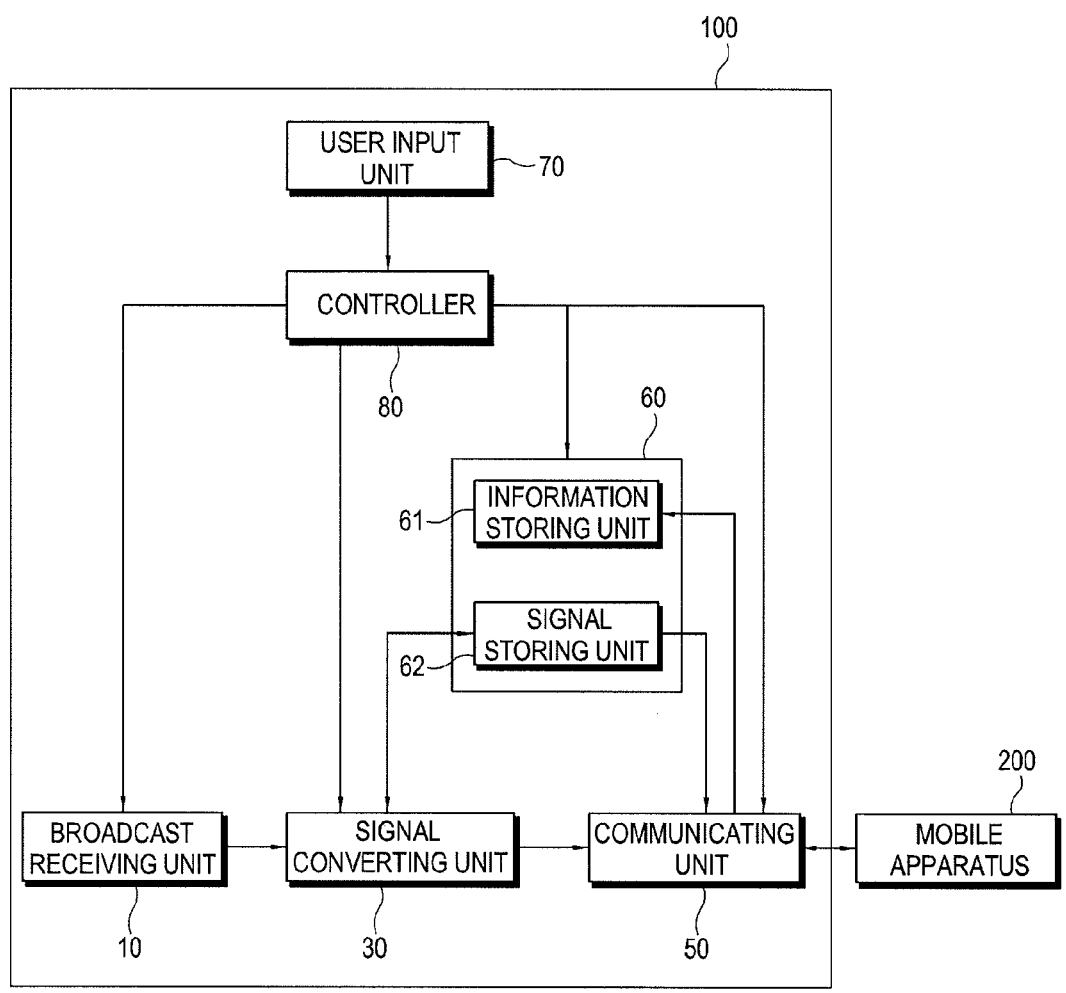
Figure 6:
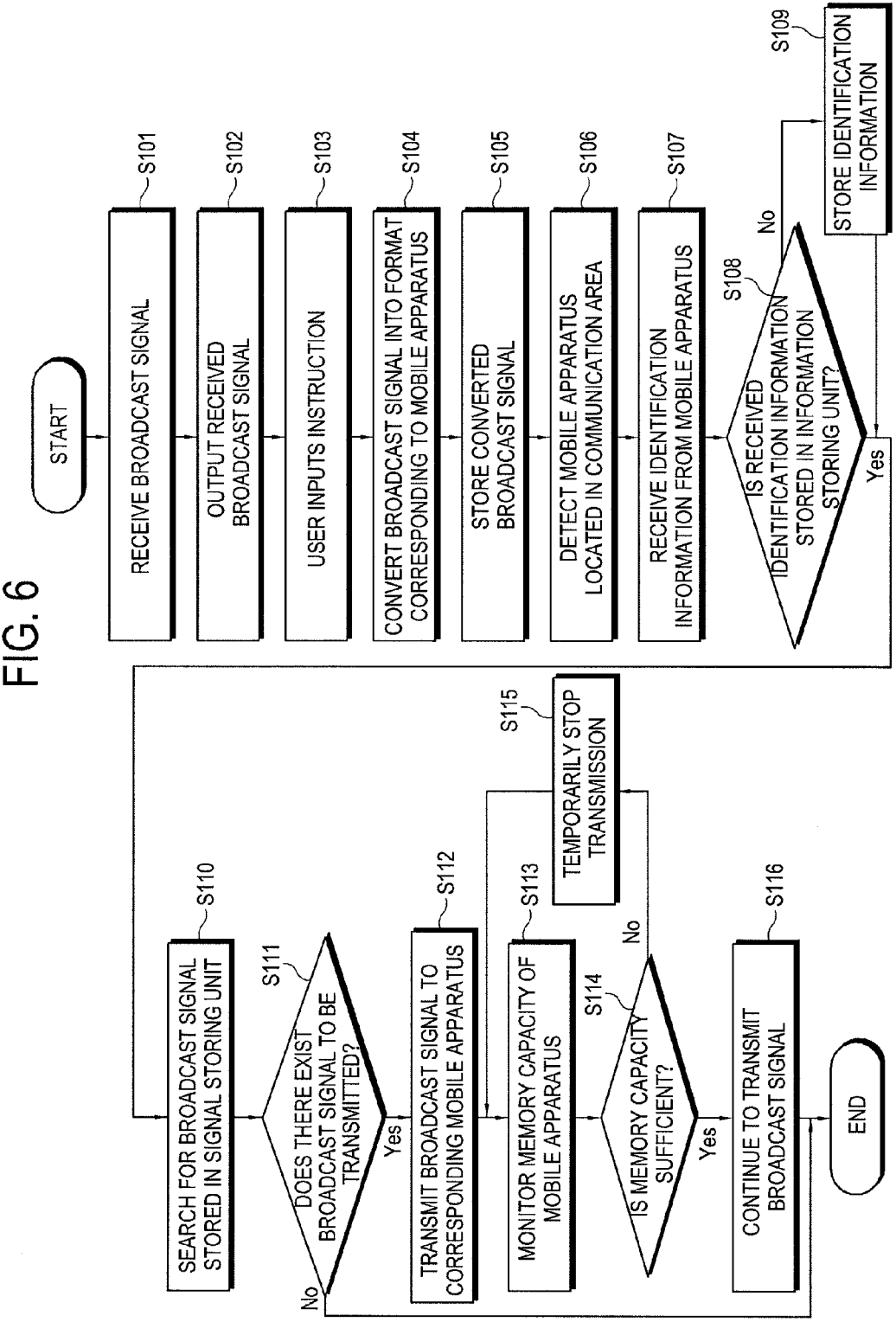
FIG. 6 is a flow chart illustrating a control method of the broadcast signal receiving according to the exemplary embodiment of the present invention.

On the other hand, as shown in FIG. 5, the broadcast signal receiving apparatus 100 may further include a data storing unit 60 and a user input unit 70. The data storing unit 60 includes an information storing unit 61 and a signal storing unit 62.

The information storing unit 61 stores identification information on at least one mobile apparatus 200.

The controller 80 receives the identification information on the mobile apparatus 200 through the communicating unit 50, stores received identification information in the information storing unit 61, and performs conversion and transmission processes for the mobile apparatus 200 corresponding to the stored identification information. The identification information may be registered or deleted under control of the controller 80.

In other words, if a mobile apparatus whose identification information is not stored in the information storing unit 61 (hereinafter referred to as a new mobile apparatus) is located in the communication area of the communicating unit 50, the controller 80 detects the new mobile apparatus and requests the new mobile apparatus to provide its identification information through the communicating unit 50.

The controller 80 receives the identification information on the new mobile apparatus through the communicating unit 50 at the request for the identification information and stores the received identification information in the information storing unit 61.

In this exemplary embodiment, the identification information may include an ID, resolution, reproducible video format, memory capacity and the like of the mobile apparatus 200 and may have a format of XML, text or the like.

If the mobile apparatus 200 is located in the communication area of the communicating unit 50, the controller 80 detects the mobile apparatus 200 and requests the mobile apparatus 200 to provide its identification information.

In addition, the controller 80 determines whether the received identification information matches with information stored in the information storing unit 61 to authenticate the mobile apparatus 200, and performs a transmission process for the authenticated mobile apparatus 200.

The signal storing unit 62 stores the received broadcast signal and its list. In this exemplary embodiment, the signal storing unit 62 may store not only the broadcast signal which has been converted in the signal converting unit 30 but also a broadcast signal which has not been converted.

The broadcast signal, which is stored in the signal storing unit 62 and has not been converted, is converted into a format corresponding to the mobile apparatus 200 through the signal converting unit 30 to then be transmitted to the mobile apparatus 200 through the communicating unit 50.

If the mobile apparatus 200 is located in the communication area of the communicating unit 50, the controller 80 detects the mobile apparatus 200 and searches for the broadcast signal list stored in the signal storing unit 62. In addition, based on a result of the search, the controller 80 transmits the broadcast signal corresponding to the detected mobile apparatus 200 to the mobile apparatus 200.

Upon completing the transmission, the controller 80 may delete the transmitted broadcast signal from the broadcast signal list stored in the signal storing unit 62.

The user input unit 70 is inputted an instruction for conversion and transmission of the broadcast signal from a user, and may include a menu key provided in a remote controller, and a key signal generating unit that generates a key signal corresponding to user's key operation. In this exemplary embodiment, the user input unit 70 may be provided as a mouse, a keyboard or other input devices known in the art, or may be provided in a main body panel of the broadcast signal receiving apparatus 100.

The controller 80 performs the conversion and transmission processes of the broadcast signal according to the instruction set in the user input unit 70.

For example, if a user inputs instructions on a channel of a broadcast signal to be converted and transmitted, broadcast time, the mobile apparatus 200 to which the broadcast signal is to be transmitted, and so on through the user input unit 70, the controller 80 receives the broadcast signal corresponding to the inputted instructions and controls the signal converting unit 30 to convert the received broadcast signal into the format corresponding to the mobile apparatus 200 to which the broadcast signal is to be transmitted.

The controller 80 stores the converted broadcast signal in the signal storing unit 62 and transmits the stored broadcast signal to the corresponding mobile apparatus 200 through the communicating unit 50.

In this exemplary embodiment, according to the instructions inputted through the user input unit 70, the controller 80 may control the stored broadcast signal to be transmitted to the mobile apparatus 200 at a specified time, or may control the converted broadcast signal to be transmitted to the mobile apparatus 200 in real time without storing the converted broadcast signal in the signal storing unit 62.

If the mobile apparatus 200 corresponding to the broadcast signal stored in the signal storing unit 62 exists in the communication area, the controller 80 may detect the mobile apparatus 200 and automatically transmit the broadcast signal to the corresponding mobile apparatus 200 without particular operation through the user input unit 70.

The controller 80 receives information on memory capacity of the mobile apparatus 200 through the communicating unit 50 and controls the transmission of the broadcast signal based on the received memory capacity information.

For example, the controller 80 compares capacity of the broadcast signal to be transmitted with memory capacity remaining in the mobile apparatus 200, and if the memory capacity of the mobile apparatus 200 is insufficient, may temporarily stop the transmission of the broadcast signal.

In addition, the controller 80 continuously monitors the memory capacity remaining in the mobile apparatus 200, and if the remaining memory capacity becomes sufficient, may control the broadcast signal to be transmitted again from the point of time when the transmission of the broadcast signal was stopped.

The controller 80 may display the information on a series of conversion and transmission processes for the received broadcast signal on the display unit 40 by means of an OSD menu.

Thus, the broadcast signal receiving apparatus 100 can simply transmit the broadcast signal to the mobile apparatus.

Hereinafter, a control method of the broadcast signal receiving apparatus 100 as constructed above will be described.

First, the broadcast receiving unit 10 receives a broadcast signal at operation S101.

Here, the received broadcast signal may include both of digital and analog broadcast signals.

The signal processing unit 20 tunes and decodes the broadcast signal received at the operation S101 under control of the controller 80, and outputs a video to the display unit 40 at operation S102.

On the other hand, the controller 80 receives an instruction on conversion and transmission of the broadcast signal, which is received at the operation S101, through the user input unit 70 at operation S103.

Upon receiving the instruction at the operation S103, the controller 80 controls the signal converting unit 30 to convert the received broadcast signal into a format corresponding to the mobile apparatus 200 based on the received instruction at operation S104.

The broadcast signal converted at the operation S104 may be stored in the signal storing unit 62 according to the instruction inputted through the user input unit 70 at operation S105.

On the other hand, the controller 80 may detect through the communicating unit 50 whether or not the mobile apparatus 200 is located in a predetermined communication area at operation S106.

If it is detected at the operation S106 that the mobile apparatus 200 is located in the communication area, the controller 80 requests the mobile apparatus 200 detected through the communicating unit 50 to provide identification information of the mobile apparatus 200 and receives the identification information from the mobile apparatus 200 at operation S107.

Upon receiving the identification information from the mobile apparatus 200 through the communicating unit 50 at the operation S107, the controller 80 compares the received identification with information stored in the information storing unit 61 at operation S108.

If the received identification information matches with the information stored in the information storing unit 61 at the operation S108, the controller 80 searches for the broadcast signal stored in the signal storing unit 62 and its list at operation S110.

If the received identification information does not match with the information stored in the information storing unit 61 at the operation S108, the controller 80 determines that the mobile apparatus 200 is a new mobile apparatus, and stores the identification information, which includes an ID, resolution, reproducible video format, memory capacity and the like corresponding to the mobile apparatus 200, in the information storing unit 61 at operation S109.

Here, if the identification information on the corresponding mobile apparatus 200 was stored in advance in the information storing unit 61, the operation S109 may be omitted.

If a broadcast signal to be transmitted exists in the signal storing unit 62 at operation S111, the controller 80 transmits the broadcast signal to the corresponding mobile apparatus 200 through the communicating unit 50 at operation S112.

The controller 80 may transmit the broadcast signal at a preset time according to an instruction inputted through the user input unit 70 at the operation S112, or may automatically transmit the broadcast signal without a separate instruction, if there exists a broadcast signal to be transmitted, at the operation S111.

In addition, the controller 80 may transmit the broadcast signal converted at the operation S104 to the corresponding mobile apparatus 200 in real time without storing the broadcast signal in the signal storing unit 62.

At operation S113, the controller 80 may monitor memory information of the mobile apparatus 200 to which the broadcast signal is to be transmitted through the communicating unit 50 at the operation S112.

Based on a result of the monitor of the memory information at operation S114, if memory capacity remaining in the mobile apparatus 200 is sufficient, the controller 80 continues to transmit the broadcast signal to the mobile apparatus 200 at operation S116.

If the remaining memory capacity is less than capacity of the broadcast signal to be transmitted at the operation S114, the transmission is temporarily stopped at operation S115.

If the transmission is temporarily stopped at the operation S115, the controller 80 lastingly monitors the memory information of the mobile apparatus 200, and if the remaining memory capacity is sufficient, transmits the broadcast signal again from a point of time when the transmission was stopped.

As apparent from the above description, exemplary embodiments of the present invention provide a broadcast signal receiving apparatus which is capable of transmitting a broadcast signal to a mobile apparatus in a simple configuration without using a server or a PC, and also provide a control method for the broadcast signal receiving apparatus.

In addition, exemplary embodiments of the present invention provide a broadcast signal receiving apparatus which is capable of converting and transmitting a broadcast signal without difficulty in various formats corresponding to various mobile apparatuses, and a control method thereof.

In addition, exemplary embodiments of the present invention provide a broadcast signal receiving apparatus which is capable of transmitting a broadcast signal to a mobile apparatus simply at a time desired by a user through wireless communication, and a control method thereof.

Furthermore, exemplary embodiments of the present invention provide a broadcast signal receiving apparatus which is capable of automatically recognizing a mobile apparatus located in a communication area through wireless communication and automatically transmitting a broadcast signal which corresponds to the recognized mobile apparatus among the stored broadcast signals to the mobile apparatus.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcast signal receiving apparatus comprising:
   a broadcast receiving unit that receives a broadcast signal;
   a communicating unit that performs communication with a mobile apparatus;
   a signal converting unit that converts the received broadcast signal;
   a controller that controls the signal converting unit to convert the received broadcast signal into a format corresponding to the mobile apparatus;

a display unit that displays the received broadcast signal, and a memory unit that stores the received broadcast signal and the converted broadcast signal, wherein the controller controls the communicating unit to receive identification information of the mobile apparatus from the mobile apparatus when the controller detects that the mobile apparatus is located in a communication area, and controls the communicating unit to transmit the converted broadcast signal to the mobile apparatus based on the identification information of the mobile apparatus.

2. The broadcast signal receiving apparatus according to claim 1, further comprising an information storing unit that stores identification information related to the mobile apparatus, wherein the controller controls the signal converting unit to convert the received broadcast signal and the communicating unit to transmit the converted broadcast signal for the mobile apparatus corresponding to the identification information stored in the information storing unit.

3. The broadcast signal receiving apparatus according to claim 2, wherein the controller detects the mobile apparatus located in a communication area through the communicating unit, receives the identification information related to the detected mobile apparatus, and stores the received identification information in the information storing unit.

4. The broadcast signal receiving apparatus according to claim 1, wherein the controller detects the mobile apparatus located in the communication area through the communicating unit, searches for the converted broadcast signal stored in the memory unit in a search, and controls the communicating unit to transmit the stored converted broadcast signal to the mobile apparatus based on a result of the search.

5. The broadcast signal receiving apparatus according to claim 1, further comprising a user input unit that receives an instruction from a user, wherein the controller controls the signal converting unit to convert the received broadcast signal and the communicating unit to transmit the converted broadcast signal according to the received instruction.

6. The broadcast signal receiving apparatus according to claim 1, wherein the communicating unit performs wireless communication with the mobile apparatus.

7. The broadcast signal receiving apparatus according to claim 1, wherein the controller controls to transmit the converted broadcast signal based on information on memory capacity of the mobile apparatus, the memory capacity information being received through the communicating unit.

8. The broadcast signal receiving apparatus according to claim 1, wherein the controller controls the display unit to display information related to converting and transmitting of the received broadcast signal.

9. A control method of a broadcast signal receiving apparatus having a broadcast receiving unit, a communicating unit, a signal converting unit, a controller, a display unit that displays a broadcast signal, and a memory unit, which are provided in a single device, the method comprising:

receiving at the broadcast receiving unit the broadcast signal;

communicating with a mobile apparatus through the communicating unit;

converting at the signal converting unit the received broadcast signal into a format corresponding to the mobile apparatus;

controlling at the controller the signal converting unit to convert the received broadcast signal into the format corresponding to the mobile apparatus;

transmitting through the communicating unit the converted broadcast signal to the mobile apparatus;

displaying at the display unit the received broadcast signal; and storing in the memory unit the received broadcast signal and the converted broadcast signal, wherein, the controller controls the communicating unit to receive identification information of the mobile apparatus from the mobile apparatus when the controller detects that the mobile apparatus is located in a communication area, and controls the communicating unit to transmit the converted broadcast signal to the mobile apparatus based on the identification information of the mobile apparatus.

10. The control method according to claim 9, further comprising:

detecting the mobile apparatus located in a communication area;

receiving identification information on the detected mobile apparatus; and storing the received identification information.

11. The control method according to claim 9, further comprising searching for the stored converted broadcast signal, wherein the transmitting the converted broadcast signal comprises transmitting the converted broadcast signal based on a result of the search.

12. The control method according to claim 9, further comprising receiving an instruction from a user, wherein the converting and transmitting the broadcast signal comprise converting and transmitting the broadcast signal according to the received instruction.

13. The control method according to claim 9, further comprising monitoring information on memory capacity of the mobile apparatus, wherein the transmitting the converted broadcast signal comprises transmitting the broadcast signal based on a result of the monitoring.

14. A content receiving apparatus comprising:

a content receiving unit that receives a content;

a communicating unit that performs communication with a mobile apparatus;

a converting unit that converts the received content;

a controller that controls the converting unit to convert the content into a format corresponding to the mobile apparatus;

a display unit that displays the received content; and a memory unit that stores the received content and the converted content, wherein the controller controls the communicating unit to receive identification information on the mobile apparatus from the mobile apparatus when the controller detects that the mobile apparatus is located in a communication area, and controls the communicating unit to transmit the converted content to the mobile apparatus based on the identification information on the mobile apparatus.

15. The content receiving apparatus according to claim 14, further comprising a user input unit that receives an instruction from a user, wherein the controller controls the converting unit to convert the received content and the communicating unit to transmit the converted content according to the received instruction.

16. A control method of a content receiving apparatus, the method comprising:
- receiving content through a receiving unit;
- performing communication with a mobile apparatus through a communicating unit;
- converting the received content through a converting unit;
- controlling the converting unit to convert the content into a format corresponding to the mobile apparatus through a controller;
- displaying the received content on a display unit; and
- storing the received content and the converted content in a memory unit,
- wherein the controller controls the communicating unit to receive identification information on the mobile apparatus from the mobile apparatus when the controller detects that the mobile apparatus is located in a communication area, and controls the communicating unit to transmit the converted content to the mobile apparatus based on the identification information on the mobile apparatus.

17. The control method according to claim 16, further comprising receiving an instruction from a user,
- wherein the converting and transmitting the broadcast signal comprise converting and transmitting the broadcast signal according to the received instruction.

\* \* \* \* \*